(12) United States Patent
Yeh et al.

(10) Patent No.: US 7,782,611 B2
(45) Date of Patent: Aug. 24, 2010

(54) COMPUTER ENCLOSURE

(75) Inventors: Chin-Wen Yeh, Taipei Hsien (TW); Qing-Zhong Meng, Shenzhen (CN); Zhi-Jian Peng, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 201 days.

(21) Appl. No.: 12/198,333

(22) Filed: Aug. 26, 2008

(65) Prior Publication Data

US 2009/0261695 A1 Oct. 22, 2009

(30) Foreign Application Priority Data

Apr. 18, 2008 (CN) .......................... 2008 2 0300587

(51) Int. Cl.
*G06F 1/16* (2006.01)
*H05K 5/06* (2006.01)

(52) U.S. Cl. .............................. 361/679.57; 312/223.2; 174/50.51; 174/520

(58) Field of Classification Search ............ 361/679.57; 312/223.2; 174/50, 50.51, 520, 550
See application file for complete search history.

(56) References Cited

U.S. PATENT DOCUMENTS

| | | | | |
|---|---|---|---|---|
| 5,732,000 A * | 3/1998 | Chiesi et al. | ............ | 361/679.57 |
| 6,307,738 B1 * | 10/2001 | Tran et al. | ............... | 361/679.57 |
| 6,362,975 B1 * | 3/2002 | Liu et al. | ................. | 312/223.2 |
| 6,373,692 B1 * | 4/2002 | Cheng | ..................... | 312/223.2 |
| 6,381,138 B1 * | 4/2002 | Chen | ..................... | 361/679.57 |
| 6,698,853 B2 * | 3/2004 | Chen et al. | ............... | 312/223.2 |
| 6,721,183 B1 * | 4/2004 | Chen et al. | ................ | 312/223.2 |
| 6,795,307 B2 * | 9/2004 | Arbogast et al. | ......... | 312/223.2 |
| 6,924,975 B2 * | 8/2005 | Lai | ........... | 312/223.2 |
| 6,929,338 B2 * | 8/2005 | Chang | ..................... | 312/223.2 |
| 6,970,351 B2 | 11/2005 | Perez et al. | | |
| 7,193,855 B2 * | 3/2007 | Fan et al. | .................. | 312/223.2 |
| 7,252,351 B2 * | 8/2007 | Chen et al. | ............... | 312/223.2 |
| 7,253,359 B2 * | 8/2007 | Chen et al. | ..................... | 174/50 |
| 7,261,383 B2 * | 8/2007 | Fan et al. | .................. | 312/223.2 |
| 7,325,846 B2 * | 2/2008 | Smith et al. | ............ | 361/679.55 |
| 7,420,812 B2 * | 9/2008 | Chen et al. | ............... | 312/223.2 |
| 7,443,661 B2 * | 10/2008 | Xu et al. | ................... | 312/223.2 |
| 7,480,148 B2 * | 1/2009 | Chen et al. | ............... | 312/223.2 |
| 7,483,263 B2 * | 1/2009 | Chen et al. | ............... | 312/223.2 |

(Continued)

*Primary Examiner*—Lisa Lea-Edmonds
(74) *Attorney, Agent, or Firm*—Clifford O. Chi

(57) ABSTRACT

A computer enclosure includes a chassis and a cover. The chassis has a first hole, and the cover has a second hole which is substantially coaxial with the first hole. A securing means engages in the first and second holes for mounting the cover on the chassis. A shield is fixed on one of the chassis and the cover. The shield defines a through hole communicating an outer side of the shield with the securing means and a receiving hole intersecting the through hole. A rotating block is rotatably positioned in the receiving hole between the through hole and the securing means. The rotating block includes a blocking portion configured to block the through hole. The rotating block defines an access hole in the blocking portion. The access hole is configured to communicate the through hole with the securing means by rotating the block to align the access hole with the securing means.

13 Claims, 5 Drawing Sheets

U.S. PATENT DOCUMENTS

| | | | |
|---|---|---|---|
| 7,483,264 B2 * | 1/2009 | Chen et al. | 361/679.57 |
| 7,486,506 B2 * | 2/2009 | Chen et al. | 312/223.2 |
| 2005/0012436 A1 * | 1/2005 | Lai | 312/223.2 |
| 2005/0017608 A1 * | 1/2005 | Lin et al. | 312/223.2 |
| 2005/0285486 A1 * | 12/2005 | Xu | 312/223.2 |
| 2007/0075613 A1 * | 4/2007 | Mau | 312/223.2 |
| 2007/0222347 A1 * | 9/2007 | Chen et al. | 312/223.2 |

* cited by examiner

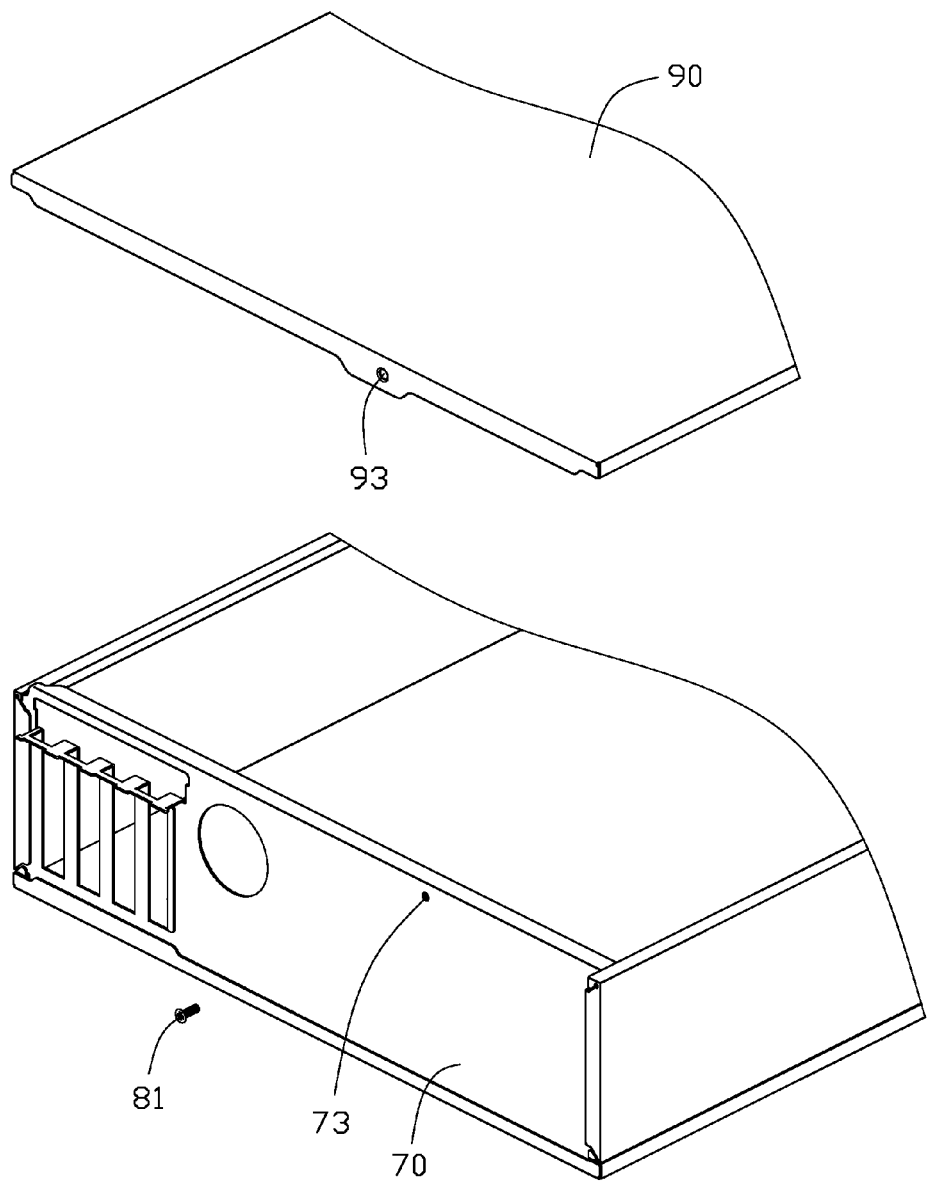
FIG. 5 <Related Art>

COMPUTER ENCLOSURE

BACKGROUND

1. Technical Field

The present invention relates to a computer enclosure for guarding against theft.

2. Description of Related Art

Computer enclosures are designed to connect different operating components together in a compact package. The operating components may include a hard drive, a graphics card, and a motherboard that are removably attached to the enclosure by friction or a few fasteners for easy replacement. However, these components may be very expensive and impossible to replace if lost, such as information stored on a hard drive.

Referring to FIG. 5, a typical computer enclosure includes a chassis 70 and a cover 90. The chassis 70 defines a screw hole 73, and the cover 90 defines a hole 93 corresponding to the screw hole 73. A screw 81 engages in the screw hole 73 and the hole 93 to mount the cover 90 to the chassis 70. However, for this type of computer enclosure, anybody can open it, and the components in it are at risk of being stolen.

Therefore, a computer enclosure that guards against theft is desired to overcome the above-described deficiency.

BRIEF DESCRIPTION OF THE DRAWINGS

FIG. 5 is an exploded, isometric view of a typical computer enclosure.

DETAILED DESCRIPTION OF THE EMBODIMENTS

Figure 1:
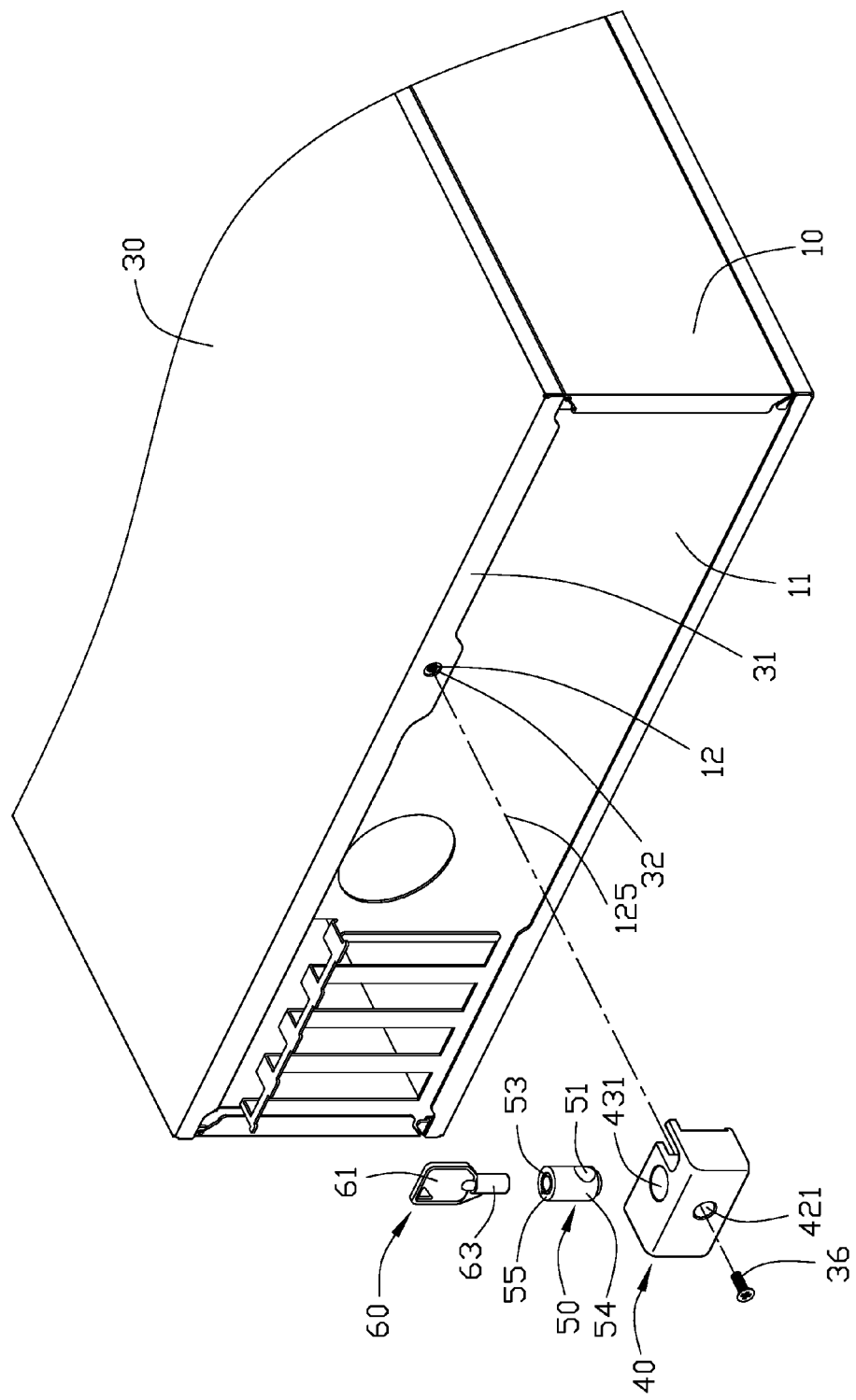
FIG. 1 is an exploded, isometric view of an embodiment of a computer enclosure, the enclosure includes a chassis, a cover, and a guarding apparatus.

Referring to FIG. 1, a computer enclosure includes a chassis 10 having an access opening (not shown) for allowing access to the interior of the chassis 10, a cover 30 mounted on the chassis 10 to cover the access opening, and a guarding apparatus (not labeled) which includes a shield 40, a rotating block 50, and a key 60.

The chassis 10 includes a sidewall 11 adjacent to the opening. The sidewall 11 defines a first hole 12 therein. The first hole 12 may be a tapped screw hole. The first hole 12 has a central axis 125. A flange 31 extends from an edge of the cover 30. The flange 31 defines a second hole 32 corresponding to the first hole 12. When the cover 30 is positioned over the access opening, the flange 31 abuts against the sidewall 11, and the first hole 12 and the second hole 32 are coaxial. In one embodiment, a fastener 36 such as a screw may be inserted through the second hole 32 and screwed into the first hole 12 to secure the cover 30 to the chassis 10.

The shield 40 defines a through hole 421 substantially coaxial with the central axis 125, and a receiving hole 431 extending in a direction substantially perpendicular to the central axis 125. The through hole 421 intersects the receiving hole 431 in the shield 40. A diameter of the through hole 421 is greater than an outer diameter of the fastener 36, such that the fastener 36 can be inserted in and out of the through hole 421.

The rotating block 50 is configured to be rotatable in the receiving hole 431 of the shield 40. The rotating block 50 includes a blocking portion 54 and an access hole 51 defined in the blocking portion 54 extending through. A diameter of the access hole 51 is substantially equal to or greater than that of the through hole 421. A driving end 55 is formed on a top portion of the rotating block 50. The driving end 55 defines a keyway 53.

Figure 2:
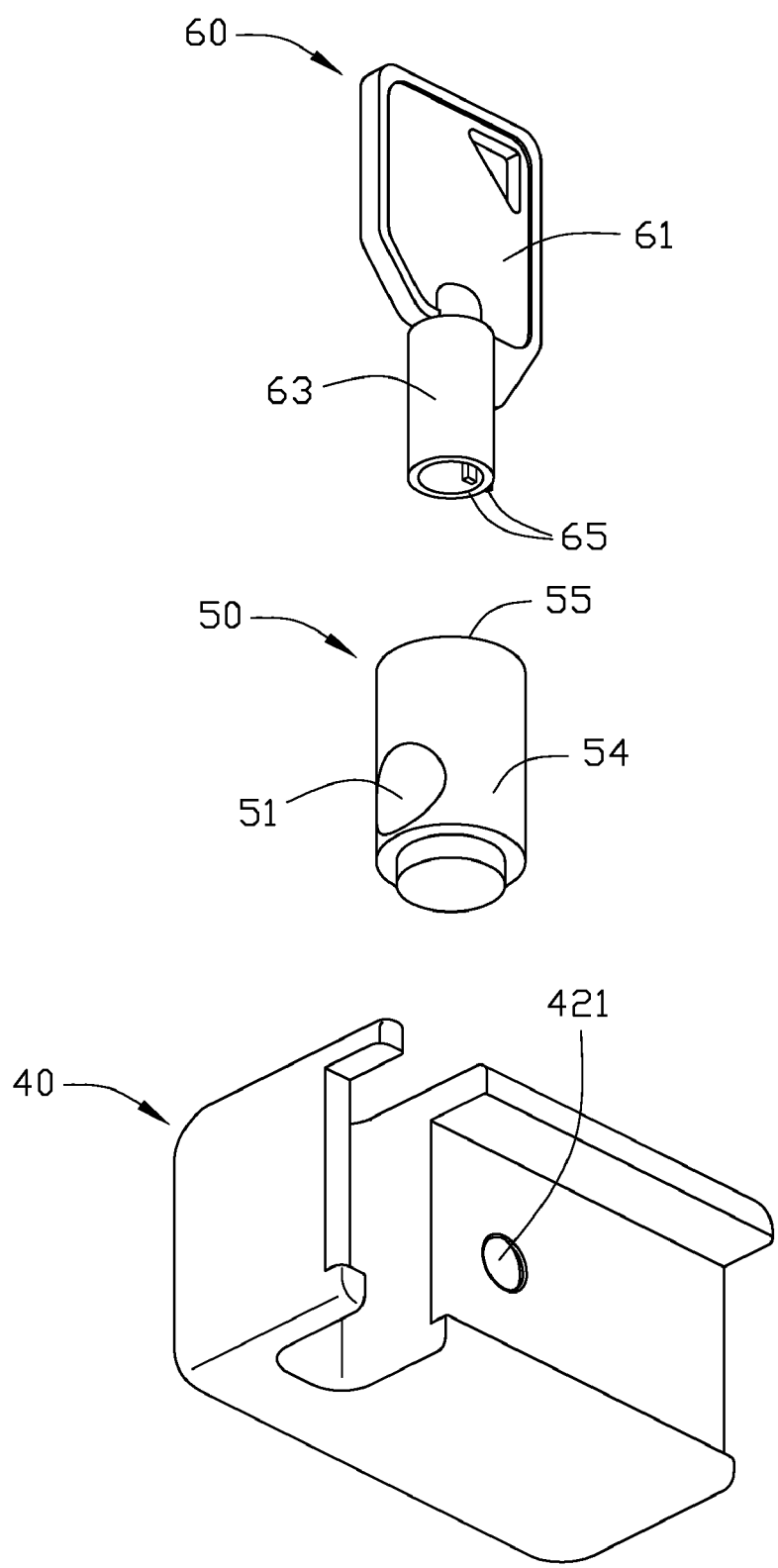
FIG. 2 is an exploded, isometric view of the guarding apparatus of the enclosure of FIG. 1.

Referring also to FIG. 2, the key 60 includes a shank 63 and a handle 61 formed at a top portion of the shank 63. A mating keyhead 65 for engaging with the keyway 53 is formed on a bottom portion of the shank 63.

The rotating block 50 is rotatably attached to the shield 40 via the receiving hole 431. The driving end 55 of the rotating block 50 is exposed through the receiving hole 431. The access hole 51 is accessible via the through hole 421.

Figure 3:
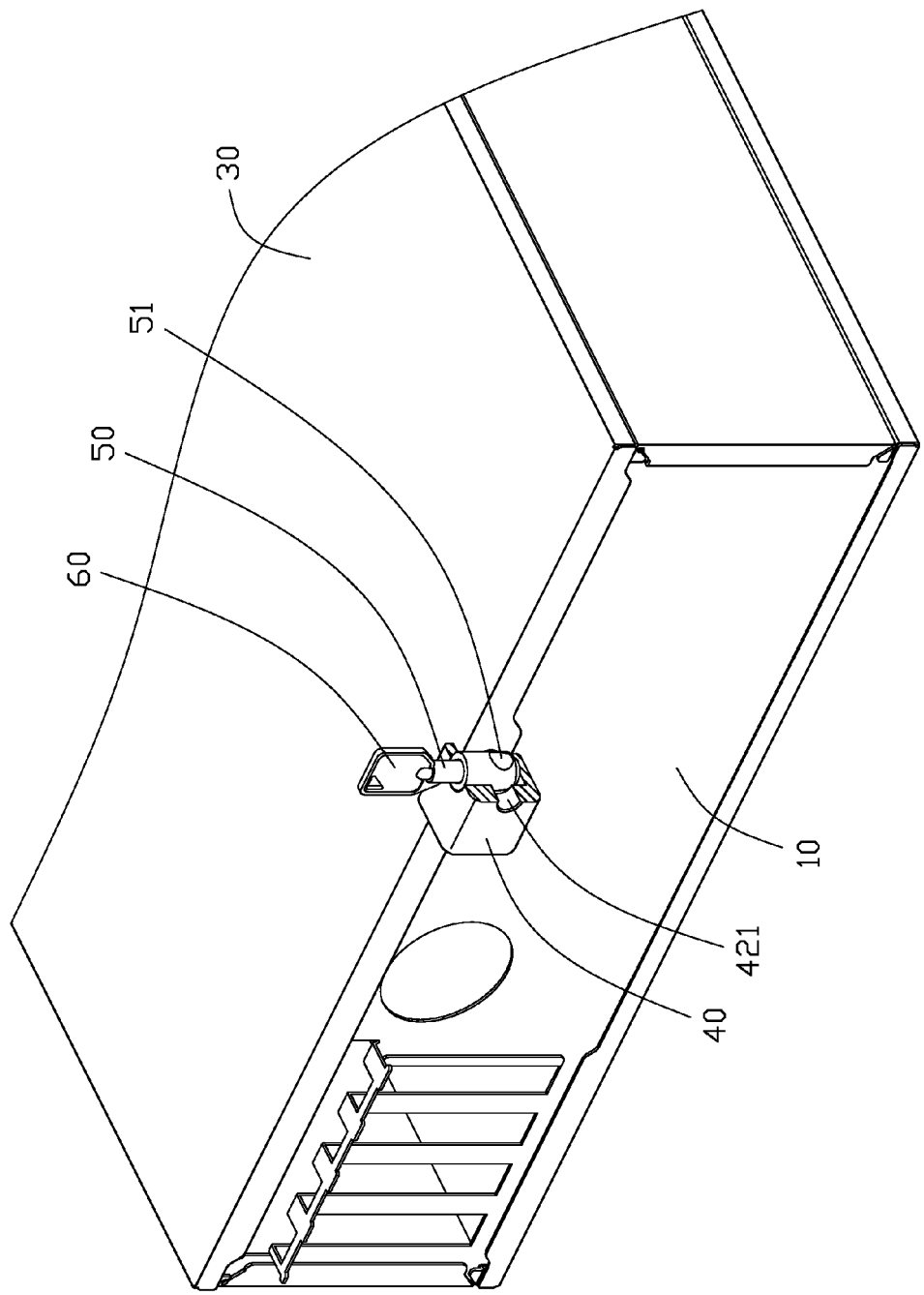
FIG. 3 is an assembled, isometric view of the computer enclosure of FIG. 1 with the guarding apparatus in a guarded state.
Figure 4:
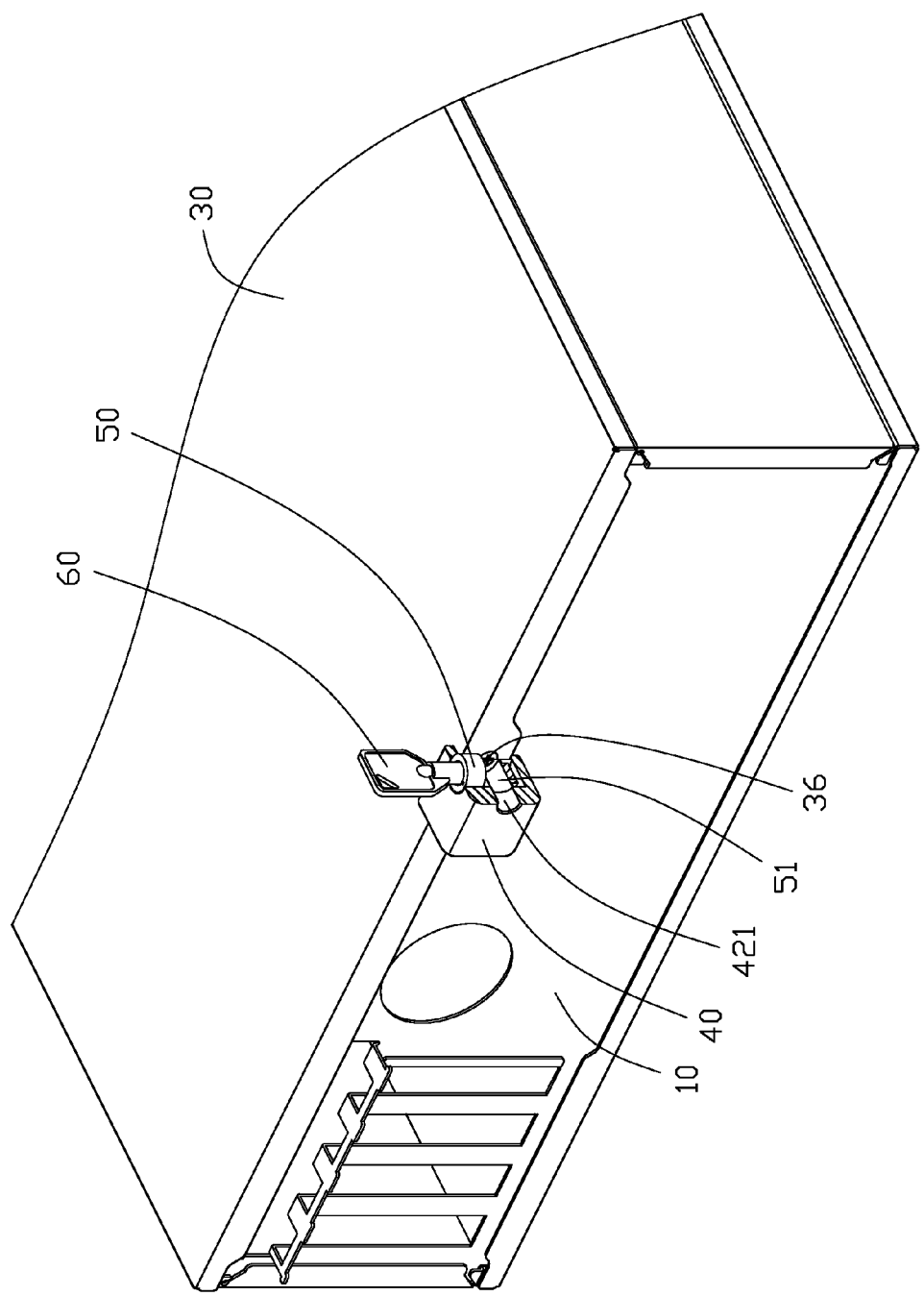
FIG. 4 is an assembled, isometric view of the computer enclosure of FIG. 1 with the guarding apparatus in an unguarded state.

Referring to FIG. 3 and FIG. 4, the fastener 36 is inserted through the second hole 32 and threadedly engaged with the first hole 12 to mount the cover 30 onto the chassis 10. In one embodiment, the shield 40 with the rotating block 50 is fixed to the cover 30 such that the through hole 421 is substantially coaxial with the central axis 125. In another embodiment, the shield 40 is fixed to the chassis 10. The keyhead 65, when engaged in the keyway 53, is configured to rotate the rotating block 50 to provide access to the fastener 36 in an unguarded state (as shown in FIG. 4) and to block access to the fastener 36 in a guarded state (as shown in FIG. 3).

If the cover 30 needs to be detached from the chassis 10, the key 60 is turned to drive the rotating block 50 to rotate about the receiving hole 431 until the access hole 51 is aligned with the through hole 421. The fastener 36 is accessible for removal from the second hole 32 through the through hole 421.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure, comprising:
a chassis having a first hole defined therein;
a cover having a second hole defined therein, wherein the second hole is substantially coaxial with the first hole;
a fastener engaging in the first and second holes for mounting the cover on the chassis;
a shield fixed on one of the chassis and the cover, wherein the shield defines a through hole communicating an outer side of the shield with the fastener and a receiving hole intersecting the through hole;
a rotating block rotatably positioned in the receiving hole between the through hole and the fastener; the rotating block comprises a blocking portion configured to block the through hole; the rotating block defines an access hole in the blocking portion; the access hole is configured to communicate the through hole with the fastener by rotating the block to align the access hole with the fastener.

2. The computer enclosure of claim 1, wherein the rotating block has a keyway defined on a driving end; the computer enclosure further comprises a key; the key having a keyhead capable of engaging with the keyway to drive the rotating block.

3. The computer enclosure of claim 2, wherein the key comprises a handle and a shank below the handle; the keyhead is defined on a bottom of the shank.

4. The computer enclosure of claim 1, wherein the fastener is a screw; the first hole is a screw hole.

5. The computer enclosure of claim 1, wherein a diameter of the access hole is equal to or greater than a diameter of the through hole.

6. The computer enclosure of claim 1, wherein the receiving hole is substantially perpendicularly to the through hole.

7. A computer enclosure, comprising:
a chassis;
a cover mounted on the chassis by a fastener;
a shield fixed on one of the chassis and the cover;
a rotating block rotatably received in the shield, wherein the rotating block is located between the fastener and an outside of the shield configured to prevent access to the fastener from the outside of the shield; the rotating block defines an access hole configured to communicate the outside of the shield with the fastener by rotating the block to align the access hole with the fastener and the outside of the shield.

8. The computer enclosure of claim 7, wherein the shield defines a through hole communicating the outside of the shield with the rotating block and a receiving hole intersecting the through hole; the rotating block is rotatably positioned in the receiving hole and between the through hole and the fastener.

9. The computer enclosure of claim 8, wherein the receiving hole is substantially perpendicularly to the through hole.

10. The computer enclosure of claim 7, wherein the rotating block has a keyway defined on a driving end; the computer enclosure further comprises a key; the key comprises a key head capable of engaging with the keyway to drive the rotating block.

11. The computer enclosure of claim 10, wherein the key comprises a handle and a shank below the handle; the key head is defined on a bottom end of the shank.

12. The computer enclosure of claim 7, wherein the fastener is a screw; the chassis defines a screw hole; the cover defines a second hole substantially coaxial with the screw hole; the screw fastens the cover to the chassis via the second hole and screw hole.

13. The computer enclosure of claim 7, wherein a diameter of the access hole is equal to or greater than a diameter of the through hole of the shield.

* * * * *